U S 0 1 2 0 0 7 5 7 6 B 2

US012007576B2

(12) United States Patent
Du et al.

(10) Patent No.: US 12,007,576 B2
(45) Date of Patent: Jun. 11, 2024

(54) LENS ARRAY TO DISPERSE ZERO-ORDER BEAMS OF AN EMITTER ARRAY ON A DIFFRACTIVE OPTICAL ELEMENT

(71) Applicant: Lumentum Operations LLC, Milpitas, CA (US)

(72) Inventors: Jihua Du, Santa Clara, CA (US); Yonghong Guo, Union City, CA (US)

(73) Assignee: Lumentum Operations LLC, San Jose, CA (US)

( * ) Notice: Subject to any disclaimer, the term of this patent is extended or adjusted under 35 U.S.C. 154(b) by 438 days.

(21) Appl. No.: 16/168,410

(22) Filed: Oct. 23, 2018

(65) Prior Publication Data

US 2020/0064642 A1 Feb. 27, 2020

Related U.S. Application Data

(60) Provisional application No. 62/723,285, filed on Aug. 27, 2018.

(51) Int. Cl.
*G02B 27/09* (2006.01)
*G02B 27/30* (2006.01)

(52) U.S. Cl.
CPC ..... *G02B 27/0961* (2013.01); *G02B 27/0944* (2013.01); *G02B 27/30* (2013.01)

(58) Field of Classification Search
CPC ............ G02B 27/0961; G02B 27/0966; G02B 27/0905; G02B 27/0944; G02B 27/30; G02B 19/0052; G02B 27/44; G02B 27/60; G02B 26/0808; H01S 3/005; G02F 2201/305; G02F 1/0105
See application file for complete search history.

(56) References Cited

U.S. PATENT DOCUMENTS

| 9,443,310 B2 | 9/2016 | Hudman et al. |
| 11,442,285 B2 | 9/2022 | Xu et al. |
| 2010/0046953 A1* | 2/2010 | Shaw ...................... H01S 5/423 398/115 |
| 2010/0118123 A1 | 5/2010 | Freedman et al. |
| 2013/0038941 A1* | 2/2013 | Pesach ............... G02B 27/0905 359/619 |

(Continued)

FOREIGN PATENT DOCUMENTS

| CN | 107450190 A | 12/2017 | |
| CN | 108227231 A | 6/2018 | |
| WO | WO-2019221993 A1 * | 11/2019 | ............. G02B 27/30 |

*Primary Examiner* — Alicia M Harrington
(74) *Attorney, Agent, or Firm* — Harrity & Harrity, LLP

(57) ABSTRACT

An optical system may include an emitter array to emit a plurality of beams of light, and a lens array. The lens array may be arranged to collimate and direct each of the plurality of beams of light. A pitch between lenses of the lens array may be larger than a pitch between emitters of the emitter array in order to cause the plurality of beams of light to be directed such that they diverge after exiting the lens array. The optical system may include a diffractive optical element to distribute each of the plurality of beams of light into a plurality of beamlets in association with creating a light pattern. The divergence of each of the plurality of beams of light may cause a plurality of zero-order beamlets, each corresponding to one of the plurality of beams of light, to diverge after exiting the diffractive optical element.

20 Claims, 3 Drawing Sheets

(56) References Cited

U.S. PATENT DOCUMENTS

| | | | |
|---|---|---|---|
| 2014/0268314 A1* | 9/2014 | Dueck | G02B 27/1086 |
| | | | 359/349 |
| 2015/0338676 A1* | 11/2015 | Cayer | G02B 27/46 |
| | | | 356/610 |
| 2017/0188016 A1* | 6/2017 | Hudman | A63F 13/213 |
| 2017/0356621 A1 | 12/2017 | Meyers et al. | |
| 2018/0031830 A1* | 2/2018 | Koike | G02B 27/0081 |
| 2020/0033695 A1* | 1/2020 | Karassiouk | B41J 2/442 |

* cited by examiner

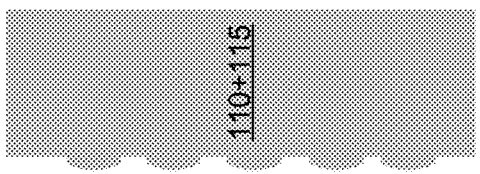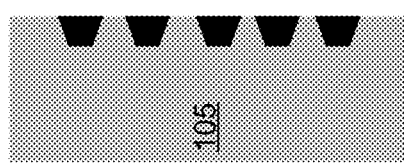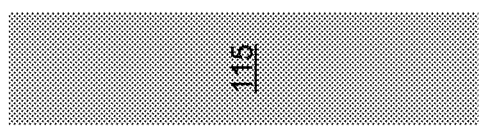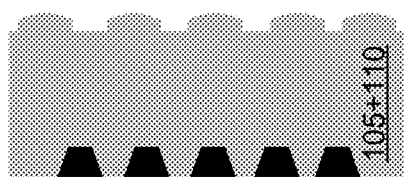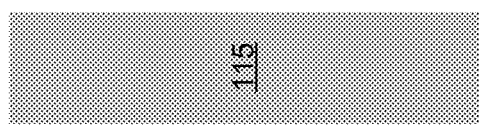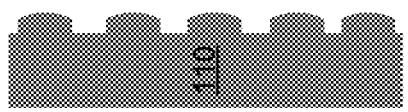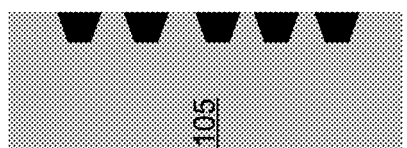

LENS ARRAY TO DISPERSE ZERO-ORDER BEAMS OF AN EMITTER ARRAY ON A DIFFRACTIVE OPTICAL ELEMENT

RELATED APPLICATION

This application claims priority under 35 U.S.C. § 119 to U.S. Provisional Patent Application No. 62/723,285, filed on Aug. 27, 2018, the content of which is incorporated by reference herein in its entirety.

TECHNICAL FIELD

The present disclosure relates to an optical system designed to create a light pattern and more specifically, an optical system, designed to create a light pattern, that includes a lens array to disperse zero-order beams when creating the light pattern.

BACKGROUND

A structured light system may include an emitter array (e.g., a vertical-cavity surface-emitting laser (VCSEL) array), a lens array (e.g., a micro lens array (MLA)), and a diffractive optical element. In operation, light emitted by emitters of the emitter array is collimated by the collimating optics, and beams of collimated light (each corresponding to a respective emitter) are directed to the diffractive optical element. The diffractive optical element distributes the collimated beams of light in order to create a light pattern. More specifically, the diffractive optical element diffracts a given beam of light such that diffracted orders of the given beam are transmitted by the diffractive optical element at different angles. An angular extent of the diffraction occurs over a range of angles relative to the surface of the diffractive optical element referred to as a field of view (FOV). The FOV can be, for example, a 60° FOV, a 90° FOV, or the like. These differently directed diffracted orders form a light pattern (e.g., a dot pattern including tens of thousands of spots) in the FOV. Depending on design requirements, the diffractive optical element can include microstructures at two phase levels (i.e., the diffractive optical element can be a binary diffractive optical element) or more than two phase levels (i.e., the diffractive optical element can be a multi-level diffractive optical element or an infinite level diffractive optical element).

SUMMARY

According to some possible implementations, an optical system may include an emitter array to emit a plurality of beams of light; a lens array, each lens of the lens array corresponding to an emitter of the emitter array, the lens array to: collimate each of the plurality of beams of light, and direct each of the plurality of beams of light, wherein a pitch between lenses of the lens array is larger than a pitch between emitters of the emitter array in order to cause each of the plurality of beams of light to be directed such that the plurality of beams of light diverge after exiting the lens array; and a diffractive optical element to distribute, after direction by the lens array, each of the plurality of beams of light into a plurality of beamlets in association with creating a light pattern, wherein the divergence of each of the plurality of beams of light is to cause the diffractive optical element to distribute the plurality of beamlets such that a plurality of zero-order beamlets, each corresponding to one of the plurality of beams of light, diverge after exiting the diffractive optical element.

According to some possible implementations, an optical system may include an optical component including: an emitter array to emit a plurality of beams of light; a lens array to collimate and direct each of the plurality of beams of light, wherein a pitch between lenses of the lens array is larger than a pitch between emitters of the emitter array such that the plurality of beams of light diverge after exiting the lens array; and a diffractive optical element to distribute, after direction by the lens array, each of the plurality of beams of light into a plurality of beamlets in association with creating a light pattern, wherein the diffractive optical element is to distribute the plurality of beams of light such that zero-order beamlets, each from a respective one of the plurality of beams, diverge.

According to some possible implementations, an optical device may include an emitter array comprising: a first emitter to emit a first beam of light, and a second emitter to emit a second beam of light; a lens array comprising: a first lens to collimate the first beam of light and direct the first beam of light at a first angle with respect to a diffractive optical element, and a second lens to collimate the second beam of light and direct the second beam of light at a second angle with respect to the diffractive optical element, wherein the first angle is different from the second angle such that the first beam of light and the second beam of light diverge after exiting the lens array, and wherein a pitch between the first lens and the second lens is larger than a pitch between the first emitter and the second emitter; and the diffractive optical element to distribute the first beam of light and the second beam of light in association with creating patterned light, wherein the divergence of the first beam of light and the second beam of light cause the diffractive optical element to distribute the first beam of light and the second beam of light such that a first zero-order beamlet, associated with the first beam of light, and a second zero-order beamlet, associated with the second beam of light, diverge after exiting the diffractive optical element.

BRIEF DESCRIPTION OF THE DRAWINGS

FIGS. 2A-2D are cross-sectional diagrams illustrating example arrangements of components of the optical system of FIG. 1.

DETAILED DESCRIPTION

Figure 1:
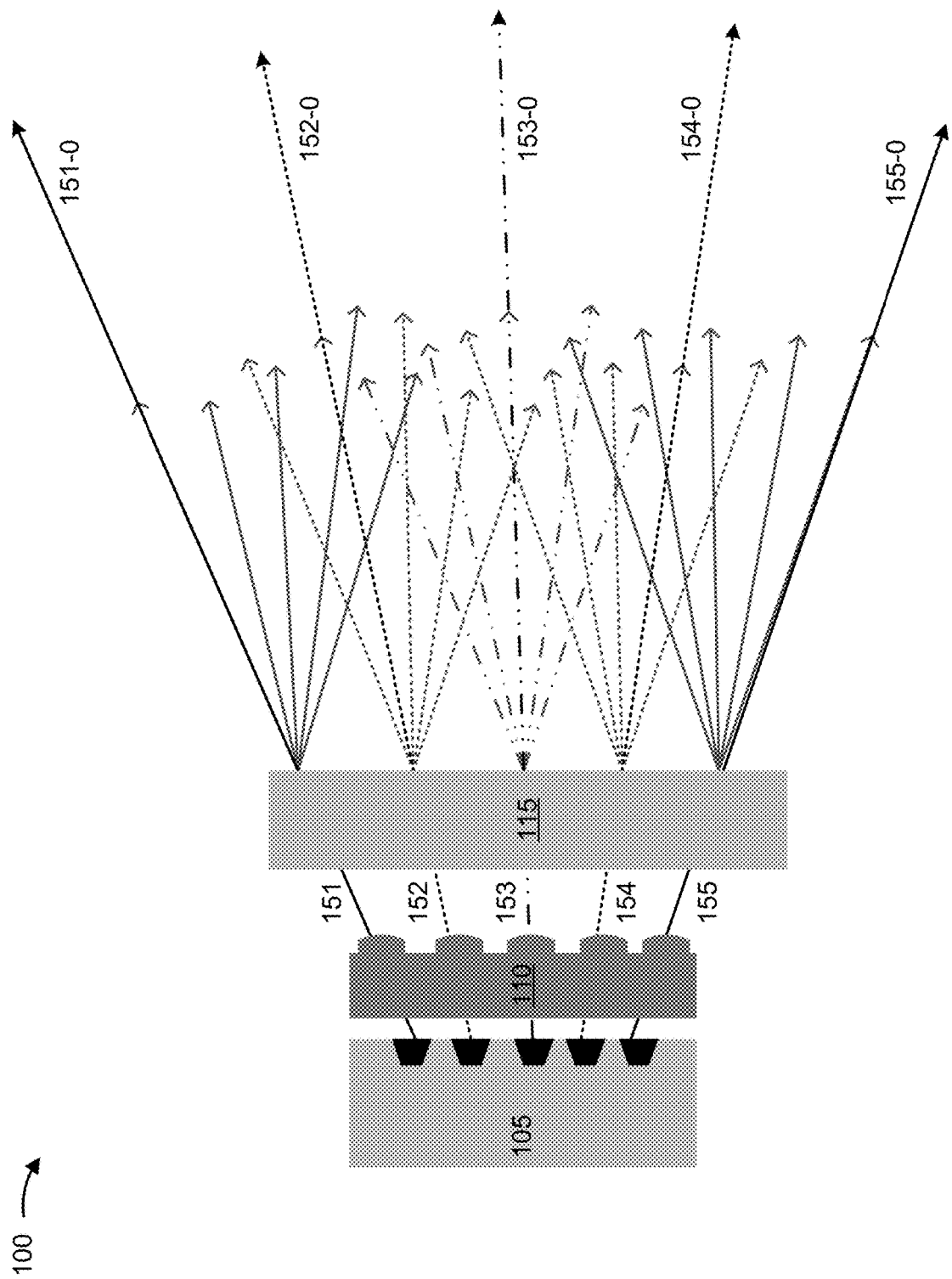
FIG. 1 is a diagram of a cross-section of an optical system, associated with creating a light pattern, that includes a lens array with a pitch that is comparatively larger than a pitch of an emitter array in order to cause beams of light, collimated and directed by the lens array, to diverge after transmission by the lens array, as described herein.

The following detailed description of example implementations refers to the accompanying drawings. The same reference numbers in different drawings may identify the same or similar elements.

As described above, a structured light system, associated with creating a light pattern (e.g., a structured light pattern), may include an emitter array, a lens array (e.g., a MLA), and a diffractive optical element. Typically, a pitch of the lens array (e.g., a distance between a given pair of adjacent lenses of the lens array) matches a pitch of the emitter array (e.g., a distance between a given pair of adjacent emitters of the emitter array), and each lens of the lens array collimates light from a respective emitter of the emitter array. Light emitted from an emitter array is collimated by the lens array, and collimated beams of light are directed to the diffractive optical element for distribution into multiple beamlets, each corresponding to a diffracted order (e.g., in order to create a plurality of spots of structured light in far field). Typically, the collimated beams of light are directed such that the collimated beams of light are incident on the diffractive optical element at normal incidence.

In order to reduce a cost and size of the emitter array, it is desirable to reduce a pitch between emitters of the emitter array as much as possible (e.g., since smaller pitches would allow for smaller emitter array chips and, therefore, more emitter array chips per wafer). However, in a typical structured light system, as the pitch between the emitters becomes smaller, overlap between spots of a resulting light pattern increases. Overlapping spots in the light pattern is undesirable, and may even render the light pattern unusable in a structured light application. As such, in order to avoid overlapping spots in the light pattern, the emitters of the emitter array need to be arranged such that a particular minimum pitch between emitters is maintained. As a result, reductions in cost and size of the emitter array may be inhibited.

Another issue with creating a light pattern is that, within the light pattern, it is desirable for the spots to be approximately the same power level (e.g., for purposes of eye safety). Generally, zero-order beamlets are a significant concern here since, in the typical structured light system, the zero-order beamlet from each emitter of the emitter array lines up in the same spot. This results in one spot in the light pattern that is significantly brighter (i.e., more powerful) than other spots of the light pattern, which can be an issue (e.g., for purpose of eye safety).

Some implementations described herein provide an optical system including an emitter array, a lens array, and a diffractive optical element, where a pitch between lenses of the lens array is larger than a pitch between emitters of the emitter array. The comparatively larger pitch between the lenses of the lens array causes light, emitted by respective emitters of the emitter array, to be collimated and directed such that collimated beams of light, transmitted by the lens array, diverge after exiting the lens array (e.g., rather than being parallel, as in a typical design). After collimation and direction by the lens array, the diffractive optical element distributes the diverging collimated beams of light into beamlets in association with creating a light pattern. Thus, the divergence of collimated beams of light causes zero-order beamlets, transmitted by the diffractive optical element, to diverge after exiting the diffractive optical element (e.g., since the zero-order beamlets will be transmitted at respective angles at which the zero-order beamlets are incident on the diffractive optical element).

Here, since the comparatively larger pitch of the lens array causes the collimated beams of light to diverge after exiting the lens array, the pitch between emitters of the emitter array may be reduced. In other words, the divergence of the collimated beams of light results in an increased spacing between spots in the light pattern (e.g., as compared to an optical system in which collimated beams are parallel after transmission by a lens array). Thus, the pitch between the emitters can be reduced, while avoiding spot overlap in the light pattern, thereby allowing cost and size of the emitter array to be reduced without inhibiting performance.

Further, since the comparatively larger pitch of the lens array causes the collimated beams to diverge after exiting the lens array, the zero-order beamlets, associated with the collimated beams, diverge after transmission by the diffractive optical element. As such, the zero-order beamlets will not be concentrated to the same single spot, which alleviates the power and safety concerns described above. In some implementations, the emitter array, the lens array, and/or the diffractive optical element may be designed such that a given zero-order beamlet, associated with a given collimated beam, overlaps with and/or is parallel to another beamlet (e.g., a higher order beamlet associated with the collimated beam or another collimated beam), which may allow a desired light pattern and/or improved spot power uniformity to be achieved.

In some implementations, the pitch between emitters of the emitter array and the pitch between the lenses of the lens array can be selected to ensure that there is no overlap due to residual divergence of collimated beams at the diffractive optical element. This may allow different diffractive optical element designs to be applied to each unit cell of the diffractive optical element (each unit cell being a region of the diffractive optical element that is designed to distribute a light associated with a respective emitter). In other words, in some implementations, the diffractive optical element can include an array of (differently designed) micro diffractive optical elements, each to distribute a respective beam of light in association with creating the light pattern.

Further, by selection of separation between the diffractive optical element and the lens array, a size (e.g., an area) of a given unit cell of the diffractive optical element can be controlled, which affects the resolution of the DOE. As such, the optical system can be designed in order to improve resolution of the diffractive optical element (e.g., at the expense of fabricating a diffractive optical element with larger area).

FIG. 1 is a diagram of a cross-section of an optical system 100, associated with creating a light pattern, that includes a lens array 110 with a pitch that is comparatively larger than a pitch of an emitter array 105 in order to cause beams of light, collimated and directed by lens array 110, to diverge after transmission by lens array 110. Optical system 100 includes one or more optical devices associated with providing a light pattern (e.g., a structured light pattern). In some implementations, optical system 100 may be referred to as a structured light system, an optical package, and/or the like. As shown in FIG. 1, optical system 100 may include an emitter array 105, a lens array 110, and a diffractive optical element 115.

Emitter array 105 includes an array (e.g., 2D array) of emitters, each capable of emitting light. For example, emitter 215 may include an array of VCSELs (e.g., bottom emitting VCSELs, top emitting VCSELs), an array of edge emitting (EE) lasers, an array of light emitting diodes (LEDs), or an array of another type of semiconductor-based light sources. In some implementations, emitter array 105 is designed such that, during operation, emitters of emitter array 105 emit light at a predominately single wavelength (e.g., such that light, emitted by a given emitter, is within approximately 10 nanometers (nm) of a design wavelength).

In some implementations, a pitch between a given pair of adjacent emitters of emitter array 105 may be smaller than a pitch between a given pair of lenses of lens array 110, as described in further detail below. In some implementations, the pitch between a given pair of adjacent emitters of emitter array 105 may be in a range from approximately 20 microns to approximately 100 microns, such as approximately 50 microns. In some implementations, a pitch between each pair of adjacent emitters of emitter array 105 may be substantially the same (e.g., emitters of emitter array 105 may have a constant spacing). Alternatively, a pitch between a given pair of adjacent emitters and a pitch between another pair of emitters may be different. In some implementations, emitter array 105 may include a one-dimensional array of emitters or a two-dimensional array of emitters. In some implementations, emitter array 105 may be a discrete optical component, or may be integrated with lens array 110 into a single optical component, as described below.

Lens array 110 includes one or more optical components capable of collimating and directing light provided by emitter array 105. For example, lens array 110 may include a MLA (e.g., comprising an array of circular micro lenses), a group of discrete lenses, and/or the like. In some implementations, a given lens of lens array 110 corresponds to a particular emitter of emitter array 105. In other words, lens array 110 may be designed and arranged such that each lens of lens array 110 is to collimate and direct light provided by a respective emitter of emitter array 105.

Figure 2A:
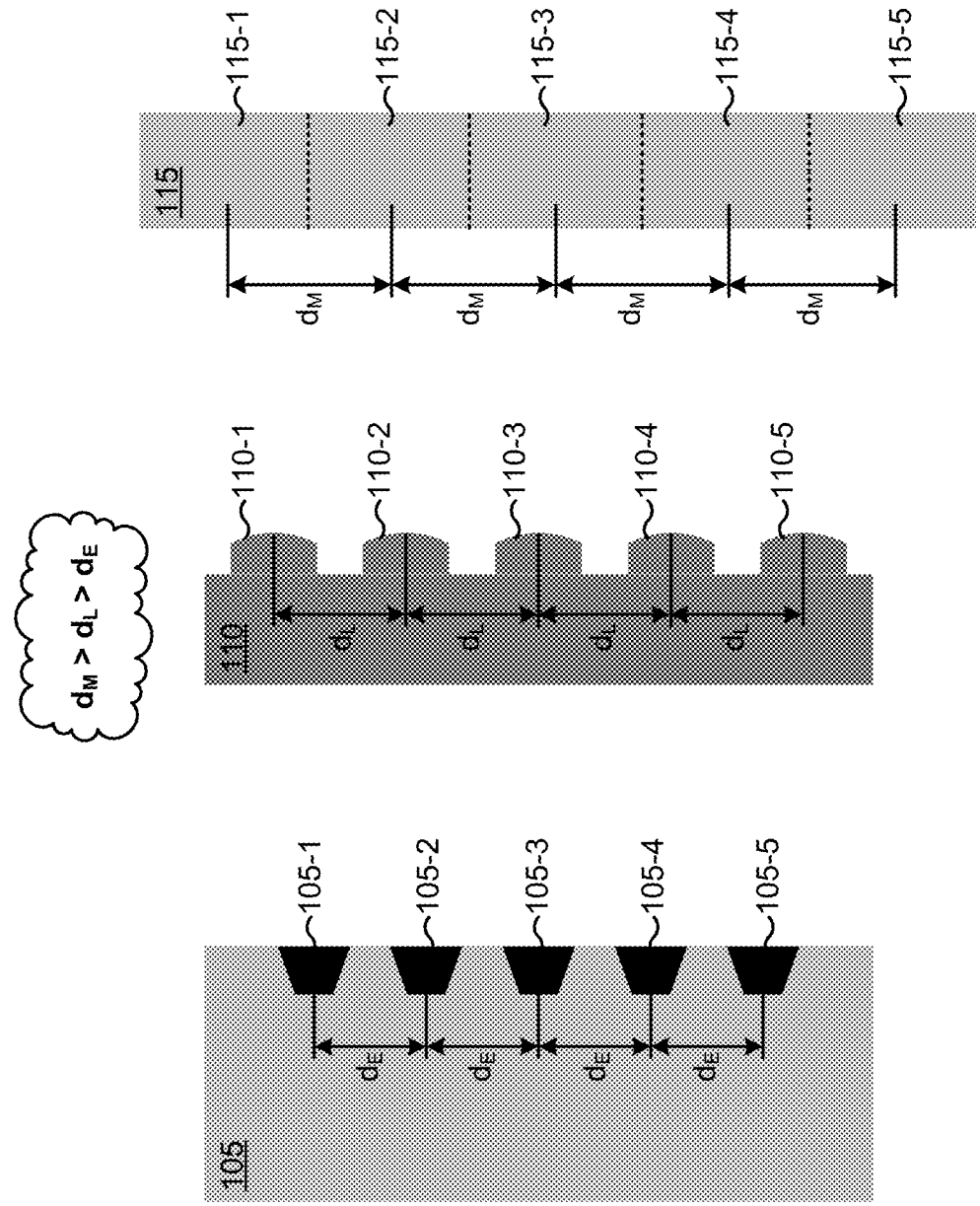

In some implementations, a pitch between a given pair of adjacent lenses of lens array 110 may be larger than a pitch between a given pair of emitters of emitter array 105. For example, with reference to FIG. 2A, a pitch $d_L$ between adjacent lenses of lens array 110 (e.g., lens 110-1 through 110-5) may be larger than a pitch $d_E$ between adjacent emitters of emitter array 105 (e.g., emitter 105-1 through 105-5). In some implementations, this comparatively larger pitch causes light, provided by emitter array 105, to be directed by lens array 110 such that collimated beams of light diverge after exiting lens array 110, as described herein. In some implementations, the pitch between a given pair of adjacent lenses of lens array 110 may be in a range from approximately 20 microns to approximately 150 microns, such as approximately 55 microns. In some implementations, a pitch between each pair of adjacent lenses of lens array 110 may be substantially the same (e.g., as shown in FIG. 2A). Alternatively, a pitch between a given pair of adjacent lenses and a pitch between another pair of adjacent lenses may be different. In some implementations, lens array 110 may include a one-dimensional array of emitters or a two-dimensional array of emitters. In some implementations, the number of lenses of lens array 110 may match or correspond to the number of emitters of emitter array 105.

In some implementations, lens array 110 may be integrated with one or more other optical components of optical system 100. For example, as illustrated in FIG. 2B, in some implementations, emitter array 105 and lens array 110 may be integrated into a single optical component. As a particular example, emitter array 105 may include an array of bottom emitting VCSELs, and lens array 110 may include a MLA formed on or affixed to a top or emission side of a chip on which the VCSELs are arranged. As another example, as illustrated in FIG. 2C, lens array 110 and diffractive optical element 115 may be integrated into a single optical component. Alternatively, as shown in FIG. 2D, lens array 110 may be a discrete optical component. For example, lens array 110 may be a MLA arranged on an optical path between emitter array 105 and diffractive optical element 115.

Returning to FIG. 1, diffractive optical element 115 includes an optical component capable of distributing light, incident on diffractive optical element 115, such that diffraction orders of light are transmitted by diffractive optical element 115. In other words, diffractive optical element 115 is an optical component capable of diffracting light in association with forming a desired light pattern (e.g., a random pattern, a periodic pattern, a rotationally symmetric, a circular pattern, a rectangular pattern, a square pattern, a linear pattern, or any other arbitrary pattern, or any of the previous patterns formed with dots, bars, or waves of light) from the diffracted orders of light incident on diffractive optical element 115.

In some implementations, diffractive optical element 115 may include an array of micro diffractive optical elements. Here, each micro diffractive optical element may be differently designed such that, effectively, diffractive optical element 115 is an array of micro diffractive optical elements. In some implementations, a given micro diffractive optical element of diffractive optical element 115 corresponds to a particular emitter of emitter array 105. In other words, diffractive optical element 115 may be designed and arranged such that each micro diffractive optical element of diffractive optical element 115 distributes light provided by a respective emitter of emitter array 105.

In some implementations, a given micro diffractive optical element of diffractive optical element 115 may be a binary diffractive optical element (with a profile having two phase levels), a multi-level diffractive optical element (with a profile having more than two phase levels), or an infinite level diffractive optical element (with a continuous phase profile). In some implementations, a number and/or arrangement of phase levels of diffractive optical element 115 and/or one or more micro diffractive optical elements of diffractive optical element 115 may be selected based on requirements for relative intensity of the diffraction orders to be transmitted by diffractive optical element 115, a required angle of FOV, a number of spots or diffracted orders to be transmitted in the FOV, and/or the like. In some implementations, diffractive optical element 115 can be formed from, for example, silicon, silica, quartz glass, and/or another type of material.

In some implementations, a pitch between a given pair of adjacent micro diffractive optical elements of diffractive optical element 115 may be larger than a pitch between a given pair of lenses of lens array 110. For example, with reference to FIG. 2A, a pitch $d_M$ between adjacent micro diffractive optical elements of diffractive optical element 115 (e.g., micro diffractive optical elements 115-1 through 115-5) may be larger than the pitch $d_L$ between lenses of lens array 110. In some implementations, the pitch between a given pair of adjacent micro diffractive optical elements of diffractive optical element 115 may be in a range from approximately 20 microns to approximately 300 microns, such as approximately 80 microns. In some implementations, a pitch between each pair of adjacent micro diffractive optical elements of diffractive optical element 115 may be substantially the same (e.g., as shown in FIG. 2A). Alternatively, a pitch between a given pair of adjacent micro diffractive optical elements and a pitch between another pair of adjacent micro diffractive optical elements may be different. In some implementations, diffractive optical element 115 may include a one-dimensional array of micro diffractive optical elements or a two-dimensional array of micro diffractive optical elements. In some implementations, the number of micro diffractive optical elements of diffractive optical element 115 may match the number of lenses of lens array 110 and the number of emitters of emitter array 105. In some implementations, the number of micro diffractive optical elements of diffractive optical element 115, the number of lenses of lens array 110, and the number of emitters of emitter array 105 may be different.

In some implementations, diffractive optical element 115 may be integrated with one or more other optical components of optical system 100, such as lens array 110, as described above. Alternatively, diffractive optical element 115 may be a discrete optical component.

In operation of optical system 100, as shown in FIG. 1, emitter array 105 emits a plurality of beams of light (e.g., beam 151, beam 152, beam 153, beam 154, and beam 155, each emitted by a respective emitter of emitter array 105) toward lens array 110. Each of the plurality of beams of light is received at a respective lens of lens array 110. As described herein, and as illustrated in FIG. 1, a pitch between lenses of lens array 110 is larger than a pitch between emitters of emitter array 105. Lens array 110 collimates the plurality of beams of light and, as a result of the comparatively larger pitch of the lenses, the plurality of beams of light is directed such that the plurality of beams of light diverge after exiting lens array 110.

As further shown in FIG. 1, the diverging plurality of beams of light is incident on diffractive optical element 115 (e.g., such that each of the plurality of beams of light is incident on diffractive optical element 115 at a different angle). In some implementations, each of the plurality of beams of light is incident on a respective micro diffractive optical element of diffractive optical element 115 (e.g., when diffractive optical element 115 comprises an array of micro diffractive optical elements, as described above). As shown, diffractive optical element 115 distributes each of the plurality of beams of light into a plurality of beamlets in association with creating a light pattern. In some implementations, each beamlet from a beam may correspond to a diffraction order for that beam. The plurality of beamlets includes a zero-order beamlet (e.g., a zero-order beam transmitted by diffractive optical element 115 at the angle at which an associated beam is incident on diffractive optical element 115) and one or more diffraction order beamlets (e.g., lower and/or higher diffracted order beams, as diffracted by diffractive optical element 115).

As further shown in FIG. 1, the divergence of each of the plurality of beams of light causes diffractive optical element 115 to distribute the plurality of beams such that the plurality of zero-order beamlets, each corresponding to one of the plurality of beams of light (e.g., zero-order beamlets 151-0, 152-0, 153-0, 154-0, and 155-0, corresponding to beams 151, 152, 153, 154 and 155, respectively) diverge or do not overlap after exiting the diffractive optical element.

Here, the divergence of the plurality of beams of light caused by the comparatively larger pitch of lens array 110 results in an increased spacing between spots in the light pattern (e.g., as compared to an optical system in which collimated beams are parallel after transmission by a lens array). Thus, the pitch between emitters of emitter array 105 can be reduced, while avoiding zero-order spot overlap in the light pattern, thereby allowing cost and size of emitter array 105 to be reduced without inhibiting performance.

Further, as shown, the comparatively larger pitch of lens array 110 causes the plurality of beams to diverge after exiting the lens array and, therefore, causes the zero-order beamlets to diverge after transmission by diffractive optical element 115. As such, the zero-order beamlets will not be concentrated to the same single spot in the light pattern, which alleviates power and safety concerns associated with optical system 100.

As further shown in FIG. 1, in some implementations, optical system 100 may be designed to cause a given zero-order beamlet to exit diffractive optical element 115 such that the given zero-order beamlet overlaps with another beamlet (e.g., a non-zero-order beamlet) in the light pattern. In some implementations, as shown in FIG. 1, the given zero-order beamlet and the other beamlet may correspond to the same beam of the plurality of beams. Alternatively, the given zero-order beamlet and the other beamlet may correspond to different beams of the plurality of beams. In this way, a desired light pattern and/or improved spot power uniformity can be achieved.

In some implementations, the light pattern generated by optical system 100 can be used in, for example, a three-dimensional sensing (3DS) application, a gesture recognition application, an optical communication application, a human-computer interaction application, a medical application, a biological application, an entertainment application, a security application, a manufacturing application, an application associated with remote environment reconstruction, or another type of structured light application.

FIGS. 1 and 2A-2D are provided as examples for illustrative purposes, and other examples are possible. For example, the size, number, orientation, and arrangement of optical components shown in FIGS. 1 and 2A-2D are provided as examples. In practice, optical system 100 may include additional components, fewer components, different components, differently arranged components, differently sized components, components with different relative sizes, components with a different number of elements (e.g., emitters, lenses, micro diffractive optical elements) and/or the like, than shown.

Some implementations described herein provide an optical system 100 including an emitter array 105, a lens array 110, and a diffractive optical element 115, where a pitch between lenses of lens array 110 is larger than a pitch between emitters of emitter array 105. The comparatively larger pitch between the lenses causes light, emitted by respective emitters of emitter array 105, to be collimated and directed such that collimated beams of light, transmitted by lens array 110, diverge after exiting lens array 110 (e.g., rather than being parallel, as in a typical design). After collimation and direction by lens array 110, diffractive optical element 115 distributes the diverging collimated beams of light into beamlets in association with creating a light pattern (e.g., a structured light pattern). Thus, the divergence of collimated beams of light causes zero-order beamlets, transmitted by diffractive optical element 115, to diverge after exiting diffractive optical element 115.

FIGS. 1 and 2A-2D have illustrated cross-sections of optical systems, demonstrating structures and light patterns in one dimension for simplicity of illustration. The features described and claimed herein should not be limited one dimensionally. The same principals apply equally to optical systems having a linear array of components or having a two dimensional array of components. For example, the light pattern includes a two dimensional light pattern; the emitter array includes an emitter array with a two dimensional array of emitters; the lens array includes a lens array with a two dimensional array of lenses, and the DOE includes a two dimensional DOE and/or a DOE with a two dimensional array of micro DOEs. As another example, the pitch between a given pair may refer to either of the two dimensions across a two dimensional array and the divergence of beams may refer to either or both of the two dimensions.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical system, comprising:
an emitter array to emit a plurality of beams of light;
a lens array, each lens of the lens array corresponding to an emitter of the emitter array,
the lens array to:
collimate each of the plurality of beams of light, and
direct each of the plurality of beams of light,
wherein a pitch between lenses of the lens array is larger than a pitch between emitters of the emitter array in order to cause each of the plurality of beams of light to be directed such that the plurality of beams of light diverge after exiting the lens array; and
a diffractive optical element to distribute, after direction by the lens array, each of the plurality of beams of light into a plurality of beamlets in association with creating a light pattern,
wherein the diffractive optical element includes an array of micro diffractive optical elements, each micro diffractive optical element, of the array of micro diffractive optical elements, is configured to distribute a respective one of the plurality of beams such that a plurality of zero-order beamlets, each corresponding to one of the plurality of beams of light, diverge after exiting the diffractive optical element, and
wherein the array of micro diffractive optical elements directs a zero-order beamlet, of the plurality of zero-order beamlets, to exit the diffractive optical element such that the zero-order beamlet overlaps with and travels in a same direction as a non-zero-order beamlet in the light pattern,
wherein the zero-order beamlet and the non-zero-order beamlet are included in a single beam of light of the plurality of beams of light.

2. The optical system of claim 1, wherein the lens array and the diffractive optical element are arranged such that each of the plurality of beams of light, directed by the lens array, is received directly by the diffractive optical element without interacting with another optical element between the lens array and the diffractive optical element.

3. The optical system of claim 1, wherein the emitter array and the lens array are integrated in a single optical component.

4. The optical system of claim 3, wherein the emitter array is an array of bottom emitting vertical-cavity surface-emitting lasers.

5. The optical system of claim 1, wherein the lens array and the emitter array are discrete optical components.

6. The optical system of claim 1, wherein each micro diffractive optical element, of the array of micro diffractive optical elements, corresponds to a respective emitter of the emitter array.

7. The optical system of claim 1, wherein a pitch between micro diffractive optical elements, of the array of micro diffractive optical elements, is larger than the pitch between lenses of the lens array.

8. The optical system of claim 1, wherein the lens array and the diffractive optical element are integrated in a single optical component.

9. The optical system of claim 1, wherein the light pattern comprises a structured light pattern.

10. An optical system, comprising:
an optical component including:
an emitter array to emit a plurality of beams of light;
a lens array to collimate and direct each of the plurality of beams of light,
wherein a pitch between lenses of the lens array is larger than a pitch between emitters of the emitter array such that the plurality of beams of light diverge after exiting the lens array; and
a diffractive optical element to distribute, after direction by the lens array, each of the plurality of beams of light into a plurality of beamlets in association with creating a light pattern,
wherein the diffractive optical element includes an array of micro diffractive optical elements, each micro diffractive optical element, of the array of micro diffractive optical elements, is configured to distribute a respective one of the plurality of beams of light such that zero-order beamlets, each from a respective one of the plurality of beams of light, diverge, and
wherein the array of micro diffractive optical elements directs a zero-order beamlet, of the zero-order beamlets, to exit the diffractive optical element such that the zero-order beamlet overlaps with and travels in a same direction as a non-zero-order beamlet in the light pattern,
wherein the zero-order beamlet and the non-zero-order beamlet are included in a single beam of light of the plurality of beams of light.

11. The optical system of claim 10, wherein the lens array and the diffractive optical element are arranged such that each of the plurality of beams of light, directed by the lens array, is received directly by the diffractive optical element without interacting with another optical element between the lens array and the diffractive optical element.

12. The optical system of claim 10, wherein the emitter array is an array of bottom emitting vertical-cavity surface-emitting lasers.

13. The optical system of claim 10, wherein each micro diffractive optical element, of the array of micro diffractive optical elements, corresponds to a respective emitter of the emitter array.

14. The optical system of claim 10, wherein a pitch between micro diffractive optical elements, of the array of micro diffractive optical elements, is larger than the pitch between lenses of the lens array.

15. The optical system of claim 10, wherein the light pattern is to be used in a structured light application.

16. An optical device, comprising:
an emitter array;
a lens array; and a diffractive optical element;
the emitter array comprising:
   a first emitter to emit a first beam of light, and
   a second emitter to emit a second beam of light;
the lens array comprising:
   a first lens to collimate the first beam of light and direct the first beam of light at a first angle with respect to the diffractive optical element, and
   a second lens to collimate the second beam of light and direct the second beam of light at a second angle with respect to the diffractive optical element,
      wherein the first angle is different from the second angle such that the first beam of light and the second beam of light diverge after exiting the lens array, and
      wherein a pitch between the first lens and the second lens is larger than a pitch between the first emitter and the second emitter; and
the diffractive optical element to distribute the first beam of light and the second beam of light in association with creating patterned light,
   wherein the diffractive optical element includes an array of micro diffractive optical elements configured to distribute the first beam of light and the second beam of light such that a first zero-order beamlet, associated with the first beam of light, and a second zero-order beamlet, associated with the second beam of light, diverge after exiting the diffractive optical element, and
   wherein the array of micro diffractive optical elements directs the first zero-order beamlet to exit the diffractive optical element such that the first zero-order beamlet overlaps with and travels in a same direction as a non-zero-order beamlet associated with the first beam of light, and
   wherein the first zero-order beamlet and the non-zero-order beamlet are included in a single beam of the patterned light.

17. The optical device of claim 16, wherein the lens array and the diffractive optical element are arranged such that the first beam of light and the second beam of light are received directly by the diffractive optical element without interacting with another optical element between the lens array and the diffractive optical element.

18. The optical device of claim 16, wherein the emitter array and the lens array are integrated in a single optical component.

19. The optical device of claim 16, wherein the array of micro diffractive optical elements includes a first micro diffractive optical element to distribute the first beam of light and a second micro diffractive optical element to distribute the second beam of light.

20. The optical device of claim 16, wherein the lens array and the diffractive optical element are integrated in a single optical component.

* * * * *